United States Patent [19]

Stehle et al.

[11] Patent Number: 4,980,768
[45] Date of Patent: Dec. 25, 1990

[54] CIRCUIT ARRANGEMENT FOR CLAMPING BLACK LEVEL REFERENCE SIGNALS CONTAINED IN A VIDEO SIGNAL SEQUENCE

[75] Inventors: Richard Stehle, Konstanz; Hans-Joachim Lorenz, Radolfszell; Dietmar Dowe, Stockach-Wahlwies, all of Fed. Rep. of Germany

[73] Assignee: Computergesellschaft Konstanz, Fed. Rep. of Germany

[21] Appl. No.: 414,456

[22] Filed: Sep. 29, 1989

[30] Foreign Application Priority Data

Sep. 30, 1988 [EP] European Pat. Off. .......... 88116234

[51] Int. Cl.$^5$ .......................... H04N 5/16; H04N 3/14
[52] U.S. Cl. ......................... 358/213.16; 358/213.15; 358/213.18; 358/221; 358/171
[58] Field of Search ....................... 358/213.11, 213.16, 358/213.15, 213.18, 221, 163, 171, 172, 173, 165; 307/540

[56] References Cited

U.S. PATENT DOCUMENTS

| | | | |
|---|---|---|---|
| 4,553,169 | 11/1985 | Yoshioka et al. | 358/213.16 |
| 4,742,392 | 5/1988 | Hashimoto | 358/171 |
| 4,816,917 | 3/1989 | Yamamoto et al. | 358/213.16 |
| 4,915,929 | 11/1983 | Yoshisato | 358/171 |

FOREIGN PATENT DOCUMENTS

| | | |
|---|---|---|
| 0074683 | 3/1983 | European Pat. Off. . |
| 0220894 | 5/1987 | European Pat. Off. . |
| 58-124373A | 10/1983 | Japan . |
| 61-208386A | 2/1987 | Japan . |
| 62-116063A | 10/1987 | Japan . |

OTHER PUBLICATIONS

Eto et al., "Digital Processing Amplifier and Color Encoder", SMPTE Journal, Jan. 1978, vol. 87, pp. 15–19.

Primary Examiner—Howard W. Britton
Assistant Examiner—Safet Metjahil
Attorney, Agent, or Firm—Hill, Van Santen, Steadman & Simpson

[57] ABSTRACT

A circuit arrangement is provided for clamping the black reference signals contained in a video signal sequence of an optical line scanner comprising a CCD sensor, using a video amplifier and a following analog-to-digital converter, and a memory controlled by the black reference signal for the control criterion that influences the video amplifier. A NOR gate is connected to all of the outputs of the analog-to-digital converter and the output of the NOR gate is connected to an input of a D flip-flop which is clocked by the black reference signal, and an integrator is connected to the output of the D flip-flop by way of a network and symmetrically driven with reference to its input voltage so that the output voltage of the integrator which decreases or increases in a ramp-like manner is added to the signal voltage of the line scanner at the input of the video amplifier.

3 Claims, 1 Drawing Sheet

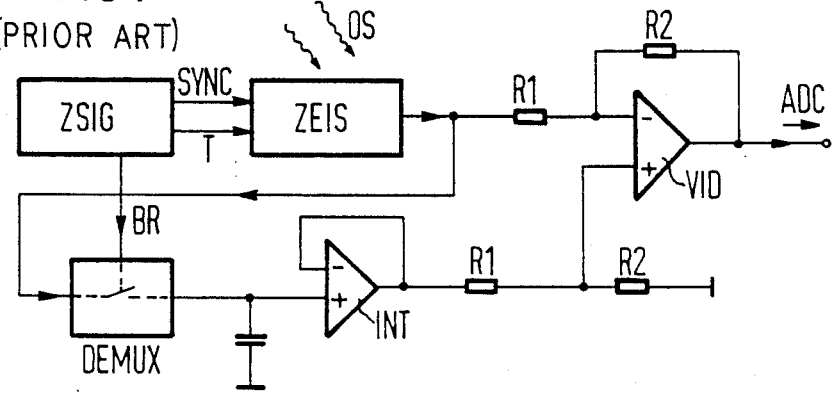
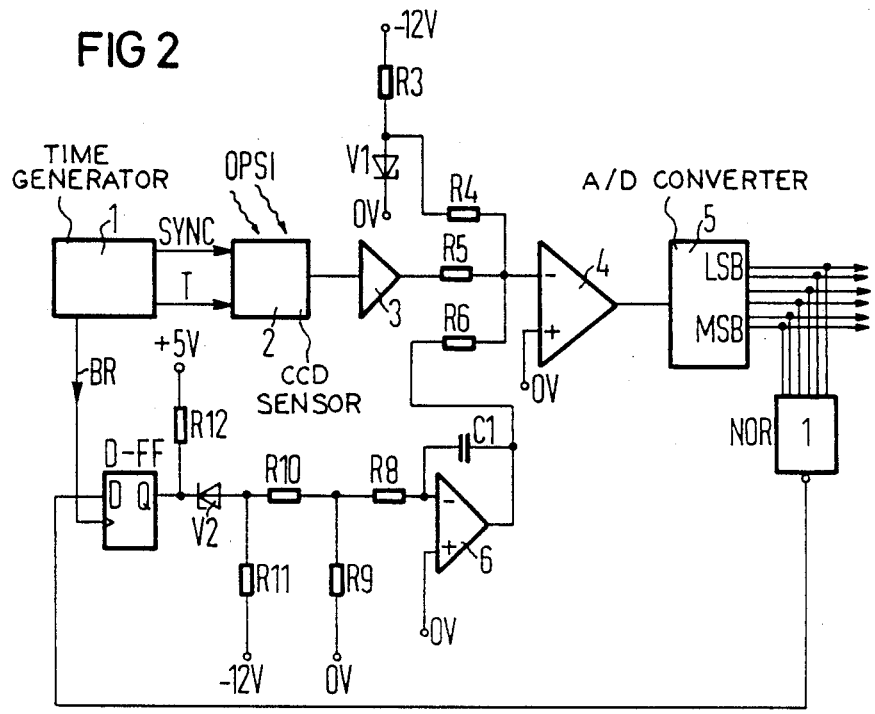

CIRCUIT ARRANGEMENT FOR CLAMPING BLACK LEVEL REFERENCE SIGNALS CONTAINED IN A VIDEO SIGNAL SEQUENCE

BACKGROUND OF THE INVENTION

Field of the Invention

The present invention is directed to a circuit for clamping black level reference signals contained in a video signal sequence of an optical line scanner which comprises a charge coupled device (CCD) sensor, using a video amplifier and an analog-to-digital converter, and a memory element controlled by the black reference signal for the controlled quantity that influences the video intensifier.

Description of the Prior Art

Image and line sensors preferably constructed in semiconductor technology, particularly sensors in integrated CCD circuit technology are employed in optical character and image pattern recognition. They usually supply video signals at their outputs that must still be appropriately conditioned in view of the application, the sensitivity and the setting to a defined black level. The setting to defined black level is frequently referred to as "black level clamping" in video technology. A standard, desired level for the signal corresponding to the "black" is zero volts. This black level differs greatly not only from type-to-type, but also from unit-to-unit and can also be additionally dependent on the temperature of the silicon chip.

It is therefore the desire for a circuit that set the output signal of CCD sensors to a defined DC voltage level, namely, particularly such that the signal level of the zero volts is assigned to the video signal "black". The problem to be solved here is inherently known from video technology because the video signal is frequently transmitted without a DC voltage level. A defined form, however, what is referred to as the "black shoulder" appears in the sequence of the video voltage signal and the video signal can usually be clamped thereto with a simple circuit composed of a series capacitor, a shunt resistor and a shunt diode. This circuit, however, has the disadvantage that the capacitor and the resistor form an RC element whose cut-off frequency must lie adequately for outside of the frequency band to be transmitted. Moreover, the circuit is generally too inaccurate because the threshold voltage of the clamping diode is dependent on the type of diode, on the unit employed and on the temperature and this threshold voltage enters on the black level.

Given CCD sensors wherein black reference picture elements are inserted into the video signal sequence at a defined location, the reference level is "filtered out" of the filter sequence, is stored and is subtracted from the current video signal. FIG. 1 illustrates the principle of such a circuit. It shows a CCD line sensor ZEIS intended for the reception of optical signals OS, a cycle sync signal SYNC and a CCD transport clock T from a time signal circuit ZSIG being supplied thereto. Black reference picture elements are inserted in the output signal of the CCD line sensors ZEIS at a defined location, these being taken out with the assistance of demultiplexers DEMUX clocked by the black level reference signal BR being held in a hold amplifier and being subtracted from a current video signal of the CCD sensor ZEIS in a video signal amplifier VID. Finally, the output signal of the video signal amplifier VID is supplied to an analog-to-digital converter ADC. Black level clamping in the digital signal domain would have required 8-bit conversion. So the analog-to digital converter ADC is not included into the clampling circuit and 6-bit-conversion is sufficient. However, the desired accuracy can be achieved only with a relatively high development and circuit expense because of the sources of error lying in the region of the analog demultiplexer DEMUX and of the video signal amplifier VID.

SUMMARY OF THE INVENTION

It is therefore the object of the invention to provide a circuit arrangement for the black level setting of an optical scanning sensor particularly constructed in CCD circuit technology, whereby meeting the precision demands and the expense connected therewith are in a comparatively favorable relationship to one another.

The above object is achieved, according to the present invention in a circuit arrangement of the type generally set forth above which is particularly characterized by a NOR gate connected to all outputs of the analog-to-digital converter, the output of the NOR gate being connected to the input of a D flip-flop clocked by the black reference signal, and by an integrator connected to the output of the D flip-flop via a network and symmetrically driven with reference to its input voltage, the output voltage of the integrator decreasing or increasing ramplike being added to the signal voltage of the line scanner at the input of the video amplifier. The desired accuracy is achieved herewith at relatively little expense on the basis of what is referred to as an integral control unit that adjusts the video signal to the required black level. The control circuit is thereby constructed around the A/D converter so that the required precision can be achieved without further measuring elements. Moreover, a simple flip-flop suffices for storing the digital control quantity instead of the involved memory constructed in analog technology.

According to a feature of the invention, a resistor-capacitor connected between the output and the input of the integrator has a time constant that defines the steepness of the ramp voltage integrator and is selected such that a voltage increase corresponding to one quantization step of the analog-to-digital converter occurs in a time interval of n line cycle times.

According to another feature of the invention, the input of the video amplifier has a voltage divider network connected thereto that comprises a plurality of resistors and a diode, a resistor thereof that lies between the voltage divider capacitor and the amplifier input being parallel to the resistors of identical size at the output of the line sensor or, respectively, of the integrator.

BRIEF DESCRIPTION OF THE DRAWINGS

Other objects, features and advantages of the invention, its organization, construction and operation will be set forth below with reference to the accompanying drawing, on which:

FIG. 1 is a schematic circuit representation of a known circuit for demultiplexing black reference picture elements, storing the same and subtracting them from the current video signal;

FIG. 2 is a schematic representation of an embodiment of the invention.

DESCRIPTION OF THE PREFERRED EMBODIMENT

Referring to FIG. 2, a time signal circuit 1 is illustrated in the main signal path for generating the cycle sync signal and the CCD transfer clock T for a CCD line sensor 2 that converts the optical signals OPSI into corresponding, electrical analog signals. It also shows a voltage follower amplifier 3 for the video signals, a video amplifier 4 and an analog-to-digital converter 5.

The aforementioned black reference picture elements are located at least one per line cycle in the serial, analog video signal of the CCD line sensor 2. These black reference picture elements appear at a defined time <of the time signal circuit 1> which is marked by a signal BR<>. At this time, the analog video signal is black by definition, i.e. the output signal of the video amplifier 4 should be zero volts at this time, this corresponding to the quantization level 0 at the output of the A/D converter 5. The amplified video signal of the CCD line sensor 2 is digitized in the A/D converter 5 with, for example, a precision of six bits. A NOR-operation NOR of all six bits provided at the output of the A/D converter 5 by a NOR gate supplies the statement "output signal is lower than the quantization level 0". This is the control criterion of the control circuit. It has the advantage that it has exactly the required precision and that it can be easily digitally stored as a one-bit signal.

This one-bit control criterion is stored in a D flip-flop D-FF at the time defined by the signal BR and is fixed for one line cycle time. This control criterion now controls the polarity at the input of an integrator 6 in the following manner. When the control criterion bit has the value "1", i.e. when the output signal is too low, then integration goes downward and the integrator 6 supplies a voltage that drops in a ramp-like shape. The voltage at the inverting input of the video amplifier 4 therefore also drops, with the result that the voltage at the output of the video amplifier 4 increases. The output signal of the A/D converter 5 then likewise increases and the control quantity moves in the direction toward the value "0". The control circuit is therefore closed suited to the polarity. It follows therefrom that the illustrated example involves a two-point controller wherein the integral behavior usually lies in the controller and not in the line.

As known, two-point controllers have the disadvantage that they oscillate. The risk that this oscillation will unnecessarily deteriorate the accuracy in the steady state can then be countered in that the steepness of the integrator ramp is made as slight as possible at both polarities. What is thereby disadvantageous is that the time for the tune-in-event becomes arbitrarily long. The best compromise between precision and tune-in time is achieved when the integrator ramp needs one or two line cycle times in order to conduct the control loop through one quantization step of the A/D converter.

The worst case for the tune-in time is present when the video signal has the maximum offset voltage, for example, 15volts, and the ramp has a steepness of one quantization step in two line times. A quantization step in the selected example is 1/64 of the highest possible video amplitude (of, for example, one volt), i.e. 1/64 volts. The control loop therefore traverses a voltage increase of one volt in 2 ×64 line times or 15 volts in 1,920 line times. Even in relatively fast scanners, the line time is about 1.5 ms long, so that the tune-in event would be reliably terminated only after 2.88 s.

This tune-in time can then be cut in half with little expense when the integrator 6 in the worst case need not traverse the entire, but only half the offset voltage amount. After turn-on, the integrator 6 is therefore started at half the maximally-possible offset voltage. This "half-value" is fed into the summing point of the video amplifier 4 via resistor R4. At is summing point the video signal supplied via the resistor R5 and the ramp voltage of the integrator 6 supplied via the resistor R6 are subtracted from one another. The voltage divider provided at the inverting input of the video amplifier 4 serves this purpose. This voltage divider is composed of the resistor R3 and of the diode V1, as well as of the resistor R4 lying between the divider tap and the amplifier input. This resistor R4 has the same size as the resistors R5 and R6 just mentioned.

In detail, a network inserted between the output of the D flip-flop D-FF and the integrator 6 has the following functions:

The resistor R12 first replaces the TTL load at the output of the D flip-flop D-FF and provides a defined, high output voltage in the "high" state. The diode V2 and the resistor R11 then shift the "low "/"high " voltage stop such that it lies symmetrically around zero volts. The integrator 6 is thus controlled with a positive or, respectively, negative signal of approximately the same size, i.e. the ramp voltage has approximately the same steepness in ascending and in descending. The amount of the steepness is set with the time constant of the R/C-combination formed by the resistor R8 and the capacitor C1 lying between the output and the input of the integrator 6.

An excessively large capacitor and an excessively large resistor are thereby avoided in that the control signal is previously divided down with the voltage divider composed of the resistors R9 and R10 as far as it is possible without loss of precision regarding the input offset voltage of the integrator.

As wanted, the integrator 6 can also be realized in digital circuit technology. When the Q output of the D flip-flop is "high", a binary counter then counts downward by one gray level step with every cycle sync. A digital-to-analog converter then converts the counter reading into an analog value that is supplied to the subtracting video amplifier 4 via the resistor R6.

Instead of being employed for black level control, the circuit shown in FIG. 2 can also be employed for controlling the video signal to a defined brightness level with precisely the same structure given a suitable selection of the signal BR. For example, an additive white level correction is achieved when a defined region of the sensor line is illuminated with defined brightness and the output signal of this line region is tuned to a defined level. The output signal then shows for every portion of the line by which it deviates from the reference brightness.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for clamping the black reference signals contained in a video signal sequence of an optical line scanner which comprises a charge coupled device sensor producing an analog output signal, comprising:
- a timing circuit for producing a sync signal, a black reference timing signal and a charge coupled device transport clock signal each at a respective output, said sync signal output and said charge coupled device transport clock signal connected to the charge coupled device sensor;
- amplifier means connected to the optical line scanner for amplifying its analog output signal, including a video amplifier;
- a digital-to-analog converter connected to said video amplifier of said amplifier means and comprising a plurality of outputs;
- a NOR gate including an output and including a plurality of inputs each connected to a respective output of said analog-to-digital converter;
- a D flip-flop including an output and including an input connected to said output of said NOR gate, and a clock terminal connected to said black reference timing signal output of said timing circuit for receiving said black reference timing signal; and
- an integrator including an input and an output, said input connected to said output of said D flip-flop and symmetrically driven with reference to its input voltage, and said output connected to said video amplifier such that its ramp like increasing or decreasing output voltage is added to the sensor signal voltage at the input of said video amplifier.

2. The circuit arrangement of claim 1, and further comprising:
- a R/C combination including a capacitor and a resistor connected between said output and said input of said integrator, said R/C-combination having a time constant that defines the steepness of the ramp voltage integrator. and being selected such that a voltage increase corresponding to a quantization step of the analog-to-digital converter occurs in a time interval of a predetermined number of line cycle times.

3. The circuit arrangement of claim 1, and further comprising:
- a voltage divider network connected between a supply voltage and said input of said video amplifier, said voltage divider network including a tap and a resistor connected between said tap and said input of said video amplifier; and
- a plurality of resistors of equal value to that of said resistor and connected between said output of said line sensor and said output of said integrator, respectively, and said input of said video amplifier.

* * * * *